(12) United States Patent
Seebacher et al.

(10) Patent No.: US 12,531,578 B2
(45) Date of Patent: Jan. 20, 2026

(54) RADIO TRANSMITTER (71) Applicant: Cypress Semiconductor Corporation, San Jose, CA (US)

(72) Inventors: David Seebacher, Villach (AT); Fabio Padovan, Villach (AT); Davide Ponton, Villach (AT); Dmytro Cherniak, Villach (AT)

(73) Assignee: Cypress Semiconductor Corporation, San Jose, CA (US)

( * ) Notice: Subject to any disclaimer, the term of this patent is extended or adjusted under 35 U.S.C. 154(b) by 305 days.

(21) Appl. No.: 18/478,775

(22) Filed: Sep. 29, 2023

(65) Prior Publication Data
US 2025/0112650 A1 Apr. 3, 2025

Related U.S. Application Data (60) Provisional application No. 63/490,246, filed on Mar. 14, 2023.

(51) Int. Cl.
*H04B 1/04* (2006.01)
*H03F 1/36* (2006.01)
*H03F 1/56* (2006.01)
*H03F 3/24* (2006.01)
*H03F 3/45* (2006.01)
*H04B 1/38* (2015.01)

(52) U.S. Cl.
CPC ............... *H04B 1/04* (2013.01); *H03F 1/56* (2013.01); *H03F 3/245* (2013.01); *H03F 2200/387* (2013.01); *H03F 2200/451* (2013.01)

(58) Field of Classification Search
None
See application file for complete search history.

(56) References Cited

U.S. PATENT DOCUMENTS

| | | | |
|---|---|---|---|
| 9,184,709 B2 * | 11/2015 | Adamski | H03F 3/2171 |
| 9,712,125 B2 * | 7/2017 | Lehtola | H03F 1/0261 |
| 10,965,260 B1 * | 3/2021 | Hahn | H03B 5/1215 |
| 11,967,937 B2 * | 4/2024 | Sun | H01L 23/49861 |
| 2023/0318537 A1 * | 10/2023 | Scott | H03F 3/3028 |
| | | | 330/136 |

(Continued)

OTHER PUBLICATIONS

A. Passamani, et al., A. Passamani, D. Ponton, E. Thaller, G. Knoblinger, A. Neviani and A. Bevilacqua, "13.9 A 1.1V 28.6dBm fully integrated digital power amplifier for mobile and wireless applications in 28nm CMOS technology with 35% PAE," 2017 IEEE International Solid-State Circuits Conference (ISSCC), San Francisco, CA, USA, 2017, pp. 232-233, doi: 10.1109/ISSCC.2017.7870346.

(Continued)

*Primary Examiner* — Pablo N Tran (57) ABSTRACT

In an embodiment, a method includes connecting a first subset of a set of stages of a power amplifier to a supply voltage, connecting a second subset of the set of stages to a reference voltage different than the supply voltage, switching a third subset of the set of stages according to a switching frequency, assigning numbers of stages in the first subset, the second subset, and the third subset based on a power requirement of the power amplifier, and amplifying a transmit signal using the first subset, the second subset, and the third subset to generate an amplified transmit signal.

20 Claims, 8 Drawing Sheets

(56) References Cited

U.S. PATENT DOCUMENTS

2024/0079998 A1* 3/2024 Drogi .................. H03F 1/56
2025/0070723 A1* 2/2025 He ..................... H03F 3/2171

OTHER PUBLICATIONS

X. Luo, et al., X. Luo, H. J. Qian, Y. Yin and H. Xu, "Empowering Multifunction: Digital Power Amplifiers, the Last RF Frontier of the Analog and Digital Kingdoms," in IEEE Microwave Magazine, vol. 21, No. 12, pp. 47-67, Dec. 2020, doi: 10.1109/MMM.2020.3023221.

A. Passamani, et al., A. Passamani, D. Ponton, A. Wolter, G. Knoblinger and A. Bevilacqua, "A 28nm Low-Voltage Digital Power-Amplifier for QAM-256 WIFI Applications in 0.5mm2 Area w/ 2D Digital-Pre-Distortion and Package Combiner," 2018 25th IEEE International Conference on Electronics, Circuits and Systems (ICECS), Bordeaux, France, 2018, pp. 21-24, doi: 10.1109/ICECS.2018.8617936.

* cited by examiner

RADIO TRANSMITTER

RELATED APPLICATION(S)

This application claims priority to U.S. Provisional 63/490,246 filed on Mar. 14, 2023 the entirety of which is hereby incorporated by reference herein.

TECHNICAL FIELD

The present disclosure relates to the field of communications, and more particularly to a transmitter for a radio.

BACKGROUND

Power amplifiers generate transmission signals for radios. Switched capacitor power amplifiers have stages that operate in parallel to amplify the transmit signal.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment, a transmitter comprises a power amplifier comprising a set of stages, each stage of the set of stages comprising an inverter, and a capacitor connected in series with the inverter, and a control unit configured to connect a first subset of the set of stages to a supply voltage, connect a second subset of the set of stages to a reference voltage different than the supply voltage, and switch a third subset of the set of stages according to a switching frequency, wherein the control unit is configured to determine numbers of stages in the first subset of the set of stages, the second subset of the set of stages, and the third subset of the set of stages based on a power requirement of the power amplifier, and a transmit signal is amplified in the power amplifier using the first subset of the set of stages, the second subset of the set of stages, and the third subset of the set of stages to generate an amplified transmit signal.

In an embodiment, a radio comprises a modem configured to generate a transmit signal, an antenna port, a transmit-receive switch connected to the antenna port, a receiver connected to the transmit-receive switch, and a transmitter connected to the transmit-receive switch and comprising a first power amplifier comprises a first set of stages, a second power amplifier comprises a second set of stages, each stage of the first set of stages and the second set of stages comprises an inverter comprising a high side switch and a low side switch connected to the high side switch at a drain node, and a capacitor connected in series with the inverter, and a control unit configured to connect a first subset of the first set of stages to a supply voltage, connect a first subset of the second set of stages to the supply voltage, connect a second subset of the first set of stages to a reference voltage different than the supply voltage, connect a second subset of the second set of stages to the reference voltage, switch a third subset of the first set of stages according to a switching frequency, and switch a third subset of the second set of stages according to the switching frequency, and a processor configured to control the transmit-receive switch to toggle between a transmit mode and a receive mode, wherein the transmitter is connected to an antenna at the antenna port when the transmit-receive switch is in the transmit mode, the receiver is connected to the antenna when the transmit-receive switch is in the receive mode, the control unit is configured to determine numbers of stages in the first subset of the first set of stages, the second subset of the first set of stages, the third subset of the first set of stages, the first subset of the second set of stages, the second subset of the second set of stages, and the third subset of the second set of stages based on a power requirement of at least one of the first power amplifier or the second power amplifier, and the transmit signal is amplified in at least one of the first power amplifier or the second power amplifier using the first subset of the first set of stages, the second subset of the first set of stages, the third subset of the first set of stages, the first subset of the second set of stages, the second subset of the second set of stages, and the third subset of the second set of stages to generate an amplified transmit signal.

In an embodiment, a system comprises means for connecting a first subset of a set of stages of a power amplifier to a supply voltage, means for connecting a second subset of the set of stages to a reference voltage different than the supply voltage, means for switching a third subset of the set of stages according to a switching frequency, means for assigning numbers of stages in the first subset, the second subset, and the third subset based on a power requirement of the power amplifier, and means for amplifying a transmit signal using the first subset, the second subset, and the third subset to generate an amplified transmit signal.

In an embodiment, a method comprises connecting a first subset of a set of stages of a power amplifier to a supply voltage, connecting a second subset of the set of stages to a reference voltage different than the supply voltage, switching a third subset of the set of stages according to a switching frequency, assigning numbers of stages in the first subset, the second subset, and the third subset based on a power requirement of the power amplifier, and amplifying a transmit signal using the first subset, the second subset, and the third subset to generate an amplified transmit signal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In some embodiments, a transmitter comprises a switched capacitor power amplifier (SCPA) having stages. Each stage includes an inverter and a series capacitor. A subset of the stages are enabled, where the number of stages enabled depends on the power requirements for the SCPA. In some embodiments, OFF stages are divided into subsets, where a supply subset is tied to a supply voltage, $V_{DD}$, and a reference subset is tied to a reference voltage, $V_{SS}$ (e.g., ground). In an application including a main SCPA and a peak SCPA, when only the main is active, the OFF stages of the peak SCPA are also divided into supply subsets and reference subsets. Although the main SCPA and peak SCPA are single-ended circuits, the subset arrangement of the peak SCPA provides a supply current characteristic similar to a differential circuit. In some applications the power amplifier may include a single SCPA. In such cases, a compensation network may be connected to the SCPA to provide the differential supply characteristic when the SCPA is configured to define supply and reference subsets for inactive stages.

Figure 1:
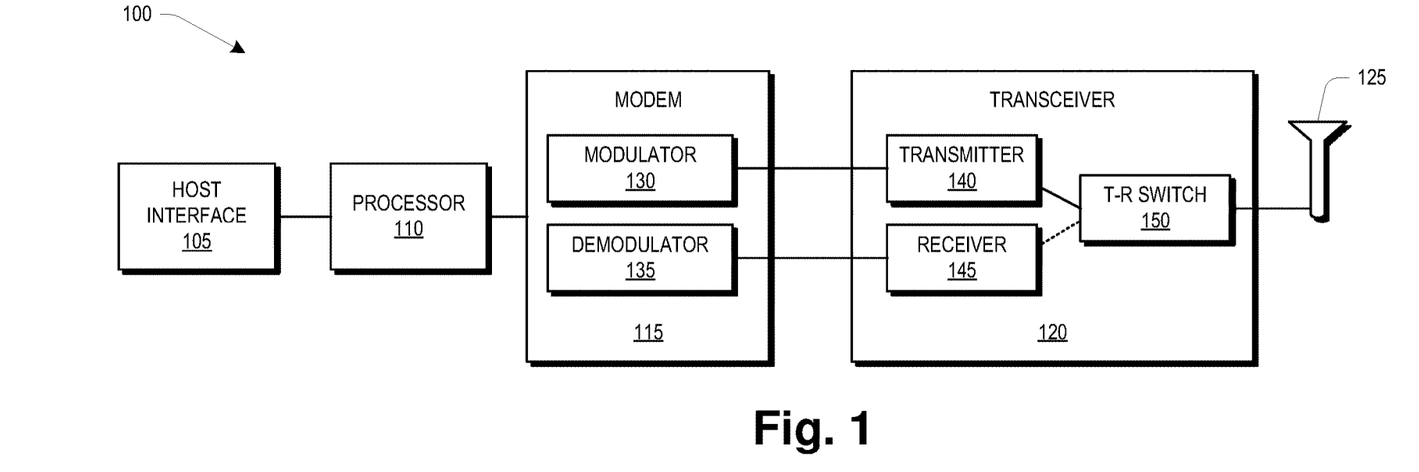
FIG. 1 is a component block diagram of a radio, according to some embodiments.

FIG. 1 is a simplified block diagram of a radio 100, according to some embodiments. The radio 100 may support one or more communication protocols, such as a Bluetooth (BT), Bluetooth Low Energy (BLE), Wi-Fi, or some other communication protocol. According to some embodiments, the radio comprises a host interface 105, a processor 110, a modem 115, a transceiver 120, and an antenna 125. The radio 100 may communicate with other devices, such as a host computer, using the host interface 105. The modem 115 comprises a modulator 130 and a demodulator 135. The transceiver 120 comprises includes a transmitter 140, a receiver 145, and a transmit-receive (T-R) switch 150. The T-R switch 150 is connected to the antenna 125 at an antenna port 155. The transmitter 140 is configured to transmit signals provided by the modulator 130 and the receiver 145 receives modulated signals and provide the modulated signals to demodulator 135 in the modem 115 for processing.

Additionally, the radio 100 may further include a number of band pass filters, amplifiers, multiplexers, demultiplexers, converters, error correction units, analog-to-digital converters (ADCs), digital-to-analog converters (DACs), or other circuits within and through which signals are passed between the antenna 125 and components of the communication system.

The processor 110 implements a software or firmware application that controls communication by the radio 100. The processor 110 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 110 may be implemented as hardware (e.g., a microprocessor, etc.) or a combination of hardware and software (e.g., a SoC, an ASIC, etc.) and may include one or multiple memories (e.g., cache, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory).

In an embodiment, components of the host interface 105, the processor 110, the modem 115, and the transceiver 120 are integrally formed or incorporated on a single integrated circuit (IC) chip. The antenna 125 can also be integrally formed on the same IC chip, or on a separate chip or substrate packaged in a single multi-chip IC package with the IC chip including the host interface 105, the processor 110, the modem 115, and the transceiver 120. Alternatively, the antenna 125, as well as other components of the radio 100 can be separately implemented on a printed circuit board (PCB) to which the IC chip including the host interface 105, the processor 110, the modem 115, and the transceiver 120 are mounted or attached.

The processor 110 controls the T-R switch 150 to toggle between transmit and receive modes such that the transmitter 140 is connected to the antenna 125 during a transmit mode and the receiver 145 is connected to the antenna 125 during a receive mode. The radio 100 may include fewer components, additional components, different components, and/or a different arrangement of components than those illustrated in FIG. 1.

Figure 2:
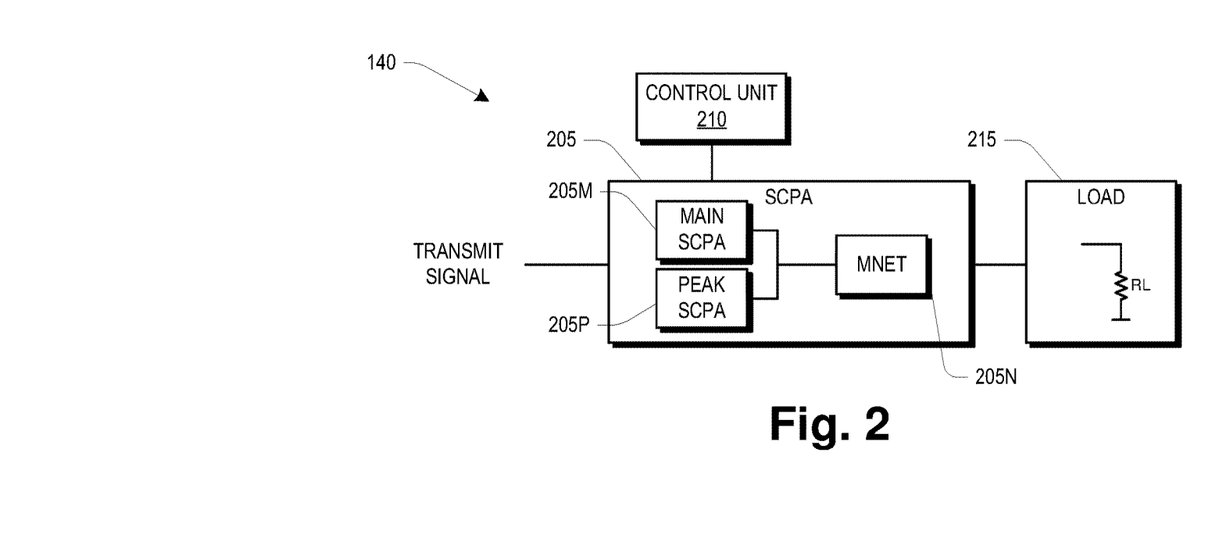
FIG. 2 is a component block diagram illustrating a transmitter, according to some embodiments.

FIG. 2 is a component block diagram illustrating the transmitter 140, according to some embodiments. In some embodiments, the transmitter 140 comprises a switched capacitor power amplifier (SCPA) 205, and a control unit 210. In FIG. 2, the SCPA 205 is connected to a load 215, such as the T-R switch 135 and the antenna 125.

The modulator 130 generates a transmit signal, such as a radio signal encoded with data. For example, the processor 110 may generate or receive data to be transmitted by the radio 100. The processor 110 may provide data to the modem 115, which processes the data in the modulator 130 to generate a transmit signal according to the communication protocol being implemented by the radio 100 to be transmitted using the antenna 125.

The SCPA 205 comprises a main SCPA 205M and a peak SCPA 205P. The main SCPA 205M is enabled for low power applications. As the power requirements increase, the number of active stages in the main SCPA 205M increase. Active stages are switched according to a switching frequency to amplify the transmit signal from the modem 115. As power requirements continue to increase, stages in the peak SCPA 205P are enabled. Inactive stages of the main SCPA 205M and the peak SCPA 205P are divided into a supply subset tied to $V_{DD}$ and a reference subset tied to $V_{SS}$. In some embodiments, a matching network 205N is provided at the output of the main SCPA 205M and the peak SCPA 205P. Although not separately illustrated, the SCPA 205 may include parasitic capacitances in addition to the capacitors used to implement the SCPA 205. The sum of the capacitances in the SCPA 205 in series with the matching network 205M form a series resonator, allowing only the fundamental tone to pass to the load 215. In some embodiments, the matching network 205N comprises one or more inductors, which may be connected in series with the load 215 ($L_S$), in parallel with the load 215 ($L_P$), or both ($L_S$ and $L_P$). The matching network 205N may include any elements necessary to provide a resultant load impedance to provide resonance.

The control unit 210 controls the stages of the SCPA 205 depending on the required power level. The control unit 210 operates active stages by switching them according to the switching frequency and divides inactive stages into supply subsets tied to $V_{DD}$ and reference subsets tied to $V_{SS}$. The inactive stages are not switched according to the switching frequency. In some embodiments, the control unit 210 is implemented by the processor 105. Additional logic external to a CPU die of the processor 105 may be present, but such additional logic may be considered part of the processor 105.

Figure 3:
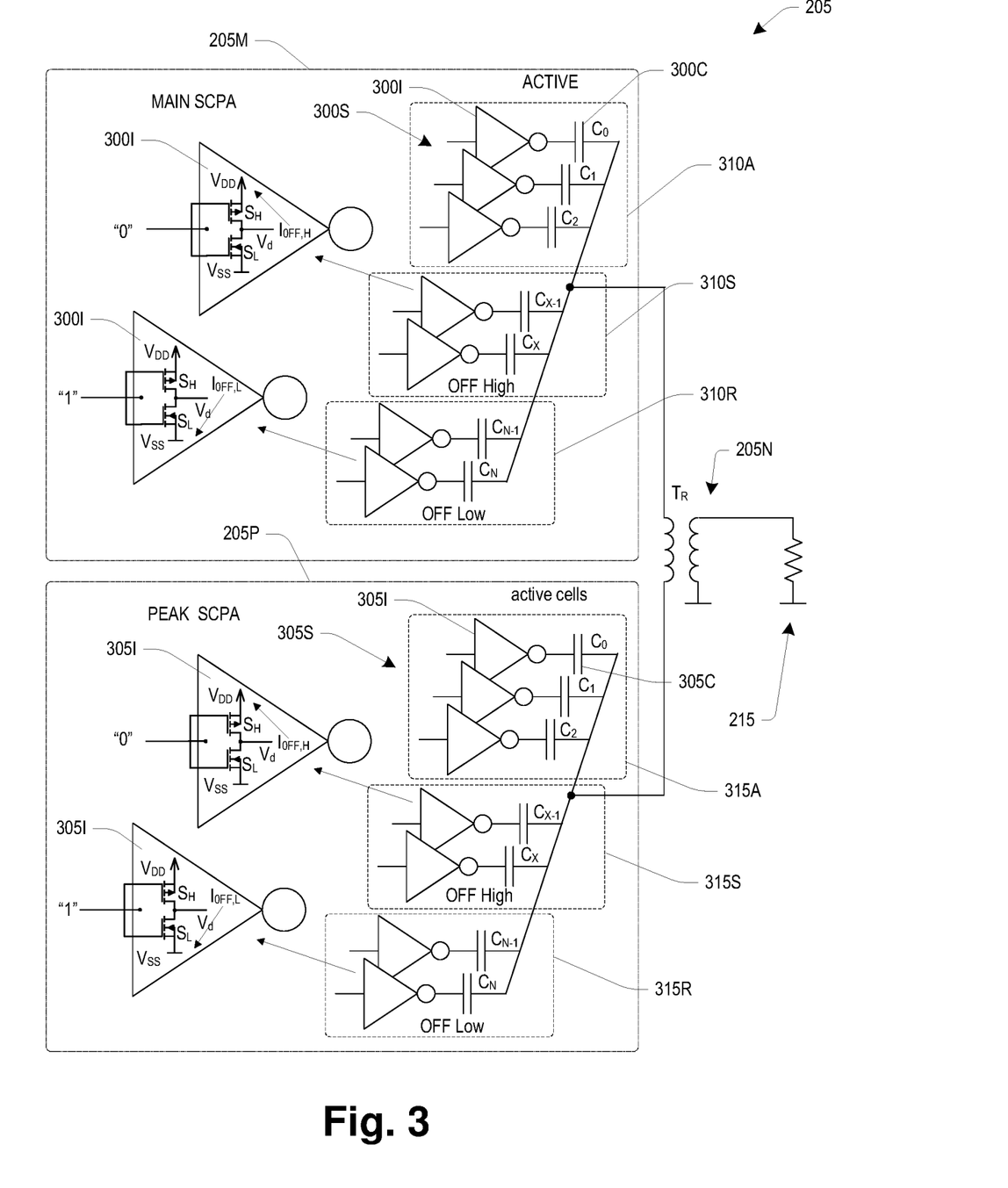
FIG. 3 is a diagram of a switched capacitor power amplifier (SCPA), according to some embodiments.

Referring to FIG. 3, a diagram of the SCPA 205, in accordance with some embodiments. In some embodiments, the matching network 215M is implemented by a transformer and the load 215 is represented as a resistor. The main SCPA 205M comprises stages 300S, each comprising an inverter 3001 and a series capacitor 300C. In some embodiments, the series capacitor 300C has the same capacitance value in each stage 300S. In some embodiments, the series capacitors 300C are weighted across the stages 300S, where the capacitance increases or decreases across the stages 300S. The inverter 3001 comprises a high side switch $S_H$ and a low side switch $S_L$. The high side switch $S_H$ may be a p-type pull-up transistor and the low side switch $S_L$ may be an n-type pull down transistor.

The peak SCPA 205P comprises stages 305S, each comprising an inverter 3051 and a series capacitor 305C. In some embodiments, the series capacitor 300C has the same capacitance value in each stage 305S. In some embodiments, the series capacitors 305C are weighted across the stages 305S, where the capacitance increases or decreases across the stages 305S. The inverter 3051 comprises a high side switch $S_H$ and a low side switch $S_L$. The high side switch $S_H$ may be a p-type pull-up transistor and the low side switch $S_L$ may be a n-type pull down transistor.

In some embodiments, the control unit 210 controls which stages 300S are active in the main SCPA 205M, and which stages 305S are active in the peak SCPA 205P depending on the power requirements. The control unit 210 divides the stages 300S of the main SCPA 205M into an active subset 310A, a supply subset 310S tied to $V_{DD}$, and a reference subset 310R tied to $V_{SS}$. The control unit 210 divides the stages 305S of the peak SCPA 205P into an active subset 315A, a supply subset 315S tied to $V_{DD}$, and a reference subset 315R tied to $V_{SS}$. In some embodiments, the control unit 210 asserts a logic "0" on the inverters 3001, 3051 in the supply subsets 310S, 315S to connect $V_D$ to $V_{DD}$ through the high side transistor $S_H$, and the control unit 210 asserts a logic "1" on the inverters 3001, 3051 in the reference subsets 310R, 315R to connect $V_D$ to $V_{SS}$ through the low side transistor $S_L$.

In some embodiments, the control unit 210 disables an even number of stages 300S in the main SCPA 205M and an even number of stages 305S in the peak SCPA 205P to provide the same numbers of stages 300S in the subsets 310S, 310R and the same numbers of stages 305S in the subsets 315S, 315R.

Figure 4:
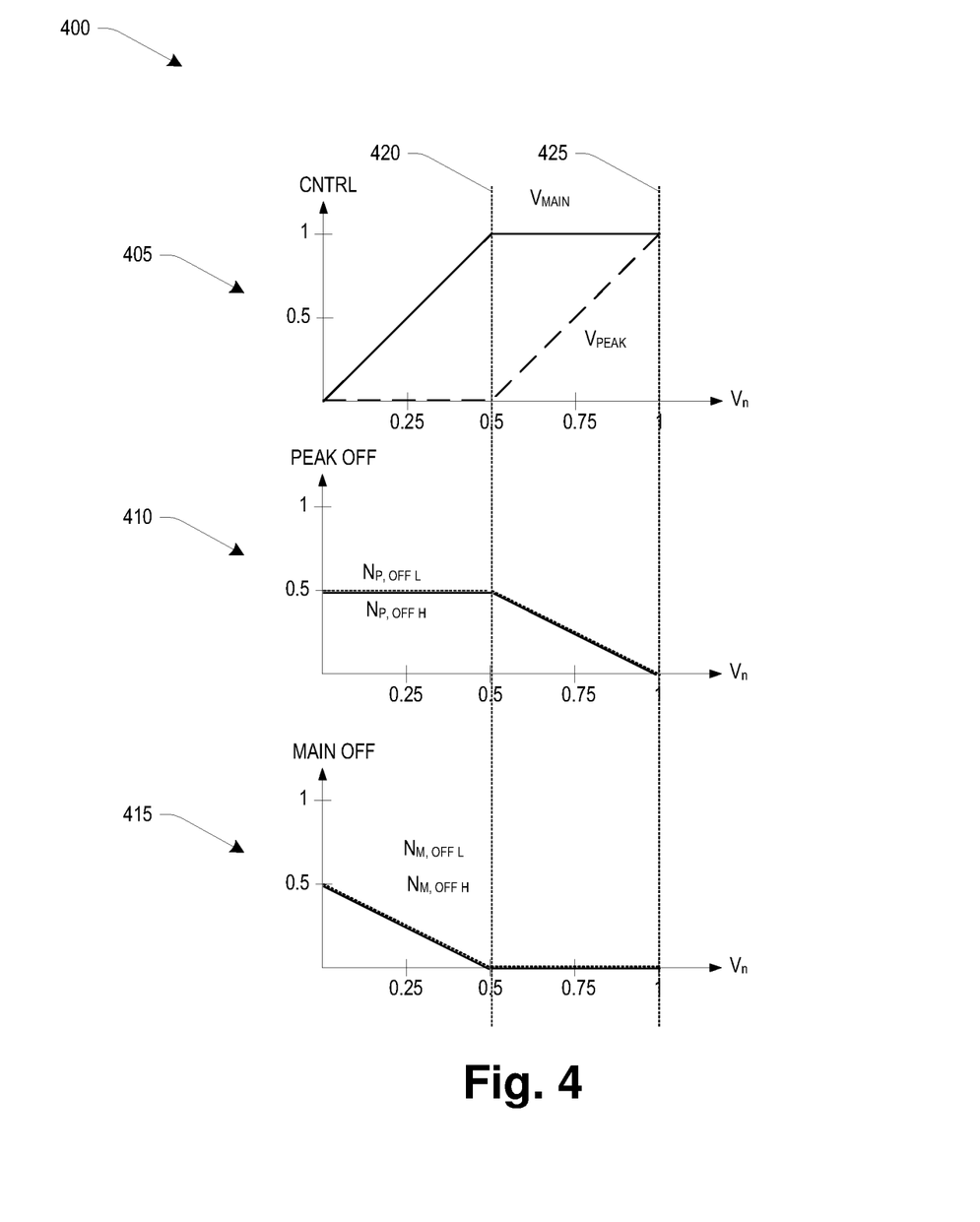
FIG. 4 is a diagram illustrating control signals in an SCPA, according to some embodiments.

FIG. 4 is a diagram 400 illustrating control signals in the SCPA 205, according to some embodiments. Plot 405 illustrates active stages, plot 410 illustrates OFF stages 305S in the peak SCPA 205P and plot 415 illustrated OFF stages 300S in the main SCPA 205M. The plots 405, 410, 415 are normalized over the total number of stages. In plot 405, $V_{MAIN}$ increases as the number of active stages 300S increases. The normalized output voltage, $V_n$, is at 0.5 at 420 when the main SCPA 205M is fully active and the peak SCPA 205P is inactive. At 425, the normalized output voltage, $V_n$, increases to 1 when the main SCPA 205M is fully active and the peak SCPA 205P is fully active.

As seen in plot 410, when the peak SCPA 205P is disabled, 0.5 of the stages 305S of the peak SCPA 205P are in the supply subset 315S (NP, OFF H) and 0.5 of the stages 305S of the peak SCPA 205P are in the supply subset 315R (NP, OFF L). The number of stages 305S in each subset 315S, 315R decreases as more stages 305S of the peak SCPA 205P become active.

As seen in plot 415, when the main SCPA 205M is disabled, 0.5 of the stages 300S of the main SCPA 205M are in the supply subset 310S (NP, OFF H) and 0.5 of the stages 300S of the main SCPA 205M are in the supply subset 310R (NP, OFF L). The number of stages 300S in each subset 310S, 310R decreases as more stages 300S of the main SCPA 205M become active.

Figure 5:
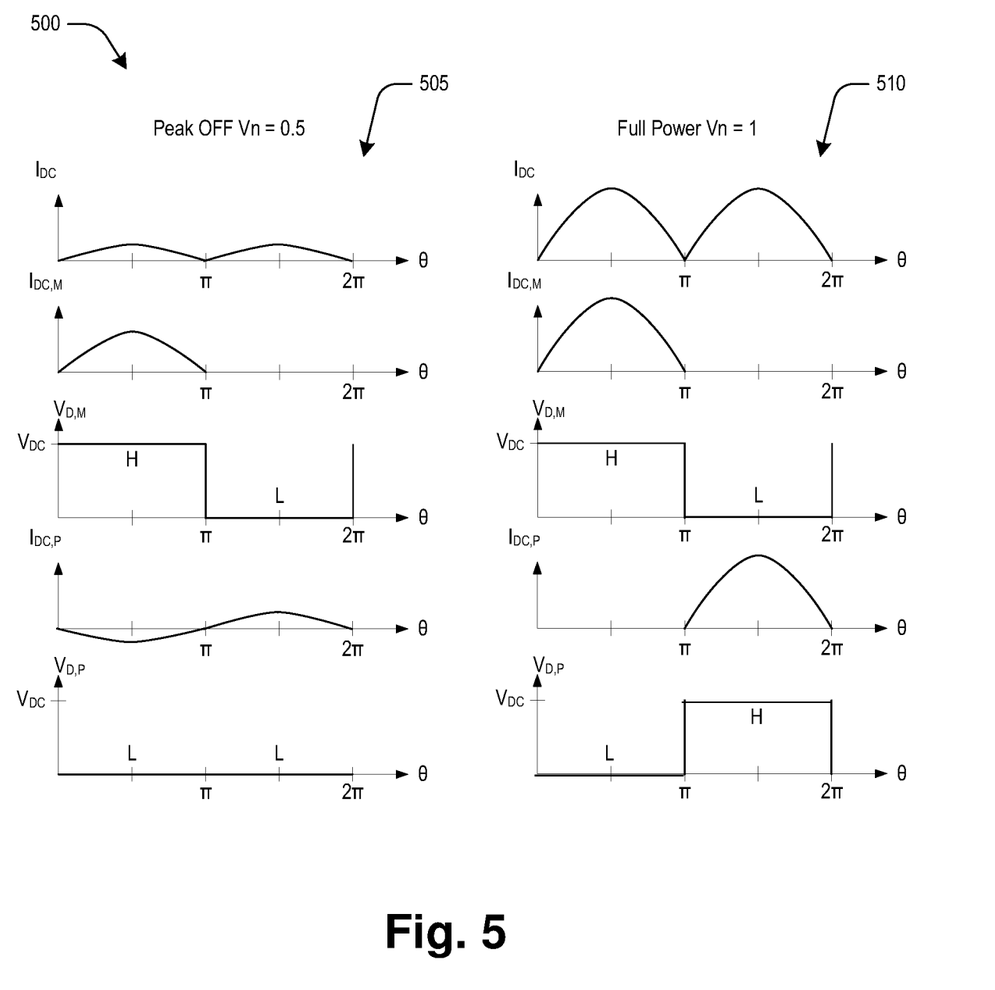
FIG. 5 is a diagram illustrating current and voltage waveforms in an SCPA, according to some embodiments.

FIG. 5 is a diagram 500 illustrating current and voltage waveforms in the SCPA 205, according to some embodiments. Waveforms are provided for total supply current ($I_{DC}$), main SCPA current ($I_{DC,M}$), main SCPA drain voltage ($V_{D,M}$), peak SCPA current ($I_{DC,P}$), and peak SCPA drain voltage ($V_{D,P}$). Plot 505 illustrates a scenario where the main SCPA 205M is active and the peak SCPA 205P is inactive (e.g., 420 in FIG. 4). Plot 510 illustrates a scenario where the main SCPA 205M is active and the peak SCPA 205P is active (e.g., 425 in FIG. 4).

Referring to plot 510, the main SCPA 205M and the peak SCPA 205P are enabled 180° out of phase resulting in the rectified waveform seen in the total supply current ($I_{DC}$) ($I_{DC,M}$+$I_{DC,P}$). It can be seen in plot 510 that for peak power, when both the main SCPA 205M and the peak SCPA 205P are contributing the same load current, the fundamental component of the supply current is canceled and two rectified sine waves are present with the first harmonic content at the second harmonic, as in a true differential implementation.

Referring to plot 505, the main SCPA 205M provides a half sine wave contribution ($I_{DC,M}$) at a reduced amplitude. However, at back-off when the peak SCPA 205P is inactive there is significant contribution from the fundamental component since only the first half of the sinewave current is on the supply. By applying the proposed switching concept the supply subset and reference subset switching behavior in FIGS. 3 and 4, some of the current in the peak SCPA 205P flows to the supply ($I_{DC,P}$) instead of ground. The $I_{DC,P}$ component reduces the magnitude of the main SCPA current ($I_{DC,M}$), which cancels the fundamental component. In turn the total supply current ($I_{DC}$) waveform looks like the waveform of a true differential circuit throughout the whole output power range.

Figure 6:
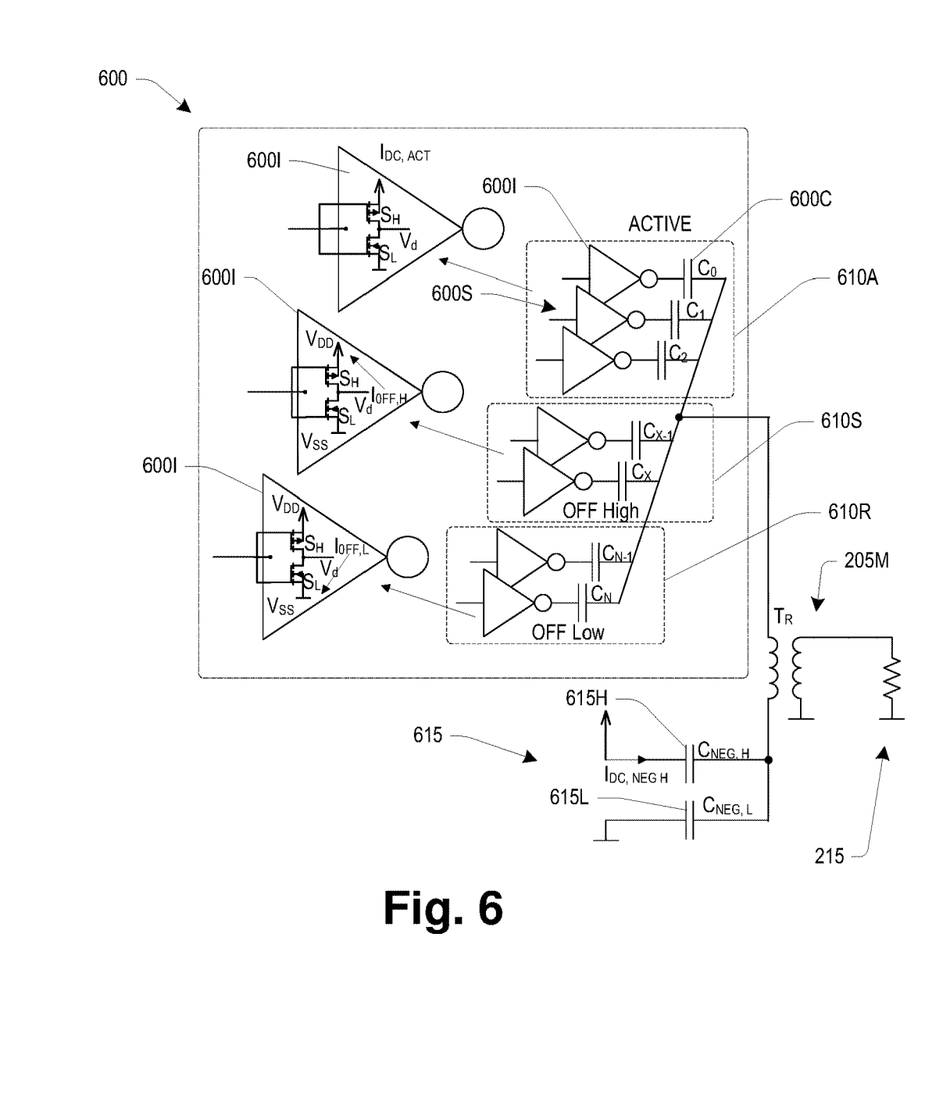
FIG. 6 is a diagram illustrating a single-ended SCPA, according to some embodiments.

FIG. 6 is a diagram illustrating a single-ended SCPA 600, according to some embodiments. In some embodiments, the matching network 215M is implemented by a transformer and the load 215 is represented as a resistor. The single-ended SCPA 600 comprises stages 600S, each comprising an inverter 6001 and a series capacitor 600C. In some embodiments, the series capacitor 600C has the same capacitance value in each stage 600S. In some embodiments, the series capacitors 600C are weighted across the stages 600S, where the capacitance increases or decreases across the stages 600S. The inverter 6001 comprises a high side switch $S_H$ and a low side switch $S_L$. The high side switch $S_H$ may be a p-type pull-up transistor and the low side switch $S_L$ may be an n-type pull down transistor.

In some embodiments, a compensation network 615 is connected to the single-ended SCPA 600. The compensation network 615 comprises a high side capacitor 615H and a low side capacitor 6115L.

In some embodiments, the control unit 210 controls which stages 600S are active in the single-ended SCPA 600 depending on the power requirements. The control unit 210 divides the stages 600S of the single-ended SCPA 600 into an active subset 610A, a supply subset 610S tied to $V_{DD}$, and a reference subset 610R tied to $V_{SS}$. In some embodiments, the control unit 210 switches the active stages 600S in the active subset 610A according to the switching frequency, asserts a logic "0" on the inverters 6001 in the supply subset 610S to connect $V_D$ to $V_{DD}$ through the high side transistor $S_H$, and asserts a logic "1" on the inverters 6001 in the reference subset 610R to connect $V_D$ to $V_{SS}$ through the low side transistor $S_L$.

Figure 7:
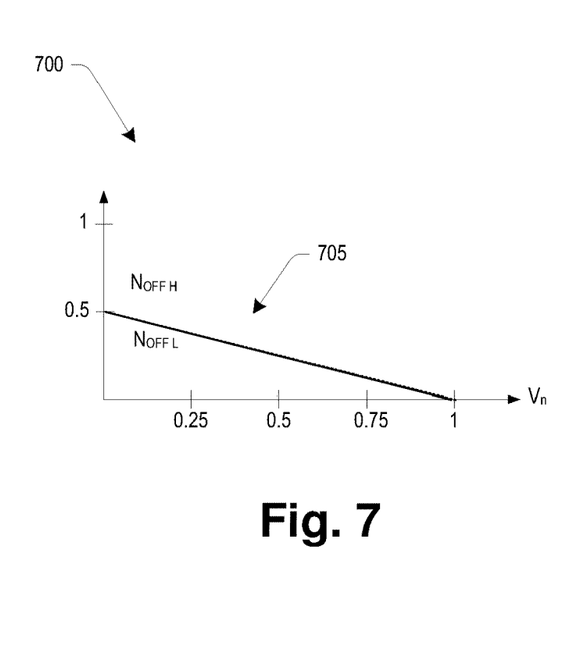
FIG. 7 is a diagram illustrating control signals in an SCPA, according to some embodiments.

FIG. 7 is a diagram illustrating control signals in the single-ended SCPA 600, according to some embodiments. As seen in plot 705, when the single-ended SCPA 600 is disabled, 0.5 of the stages 600S are in the supply subset 610S (NP, OFF H) and 0.5 of the stages 600S are in the supply subset 610R (NP, OFF L). The number of stages 600S in each subset 610S, 610R decreases as more stages 600S of the single-ended SCPA 600 become active.

Figure 8:
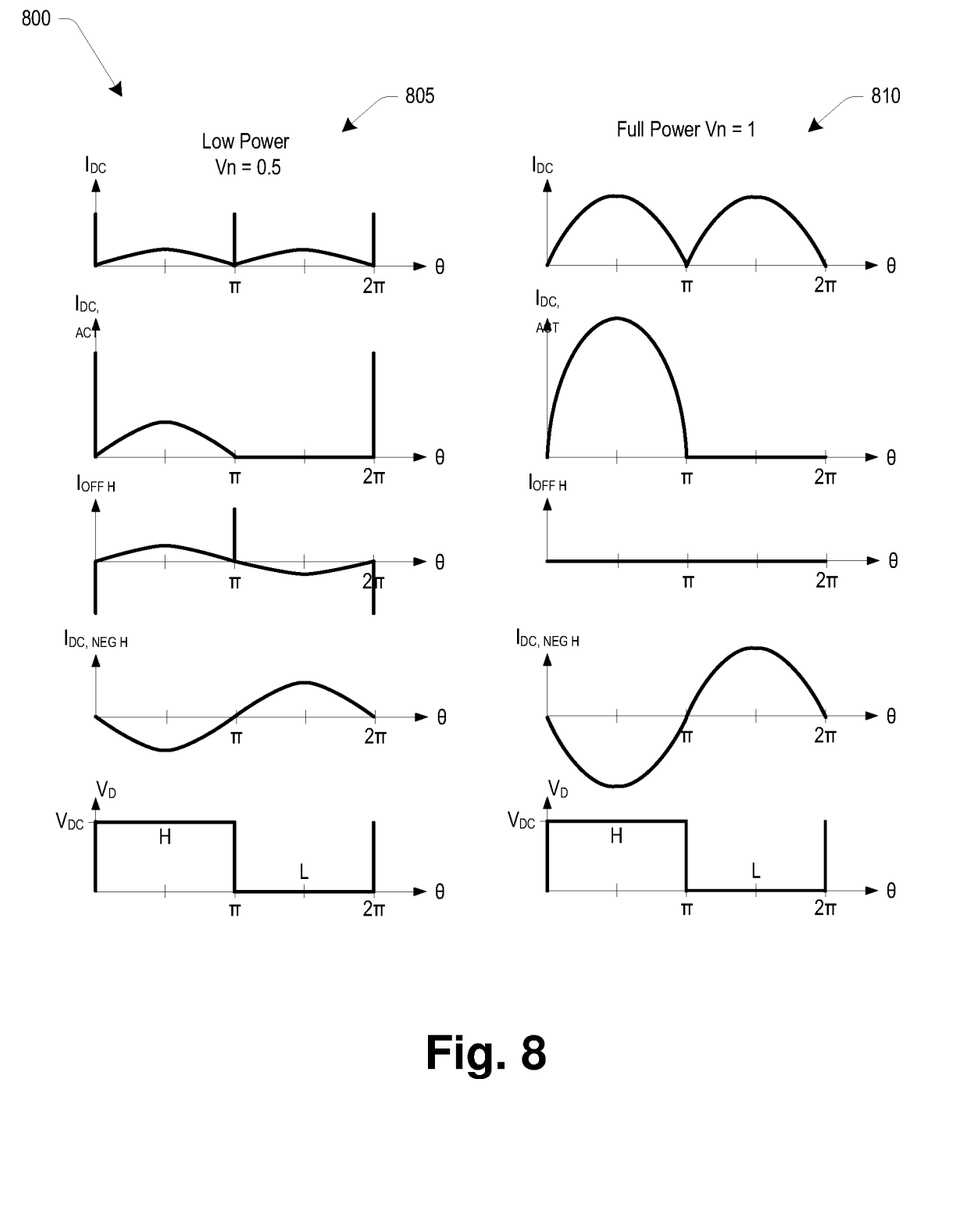
FIG. 8 is a diagram illustrating current and voltage waveforms in an SCPA, according to some embodiments.

FIG. 8 is a diagram illustrating current and voltage waveforms in the single-ended SCPA 600, according to some embodiments. Waveforms are provided for total supply current ($I_{DC}$), active stage current ($I_{DC,ACT}$), off stage current ($I_{OFF\_H}$), compensation current ($I_{DC,NEGH}$), and drain voltage ($V_D$). Plot 805 illustrates a scenario where the single-ended SCPA 600 is at half power with half of the stages 600S active and half of the stages 600S off. Plot 810 illustrates a scenario where the single-ended SCPA 600 is at full power.

Referring to plots 805, 810 the single-ended SCPA 600 generates a single sine wave output in the active stages ($I_{DC,ACT}$). The compensation network 615 generates a full sine wave waveform ($I_{DC,NEGH}$) corresponding to the fundamental RF return current. For lower powers, the fundamental RF return current ($I_{DC,NEGH}$) combined with the return current of the OFF cells ($I_{OFF\_H}$) compensate the DC current of the active stages ($I_{DC,ACT}$) such that the overall supply current ($I_{Dc}$) looks like the one of a differential implementation. Hence, the total supply current ($I_{DC}$) waveform looks like the waveform of a true differential circuit throughout the whole output power range.

Figure 9:
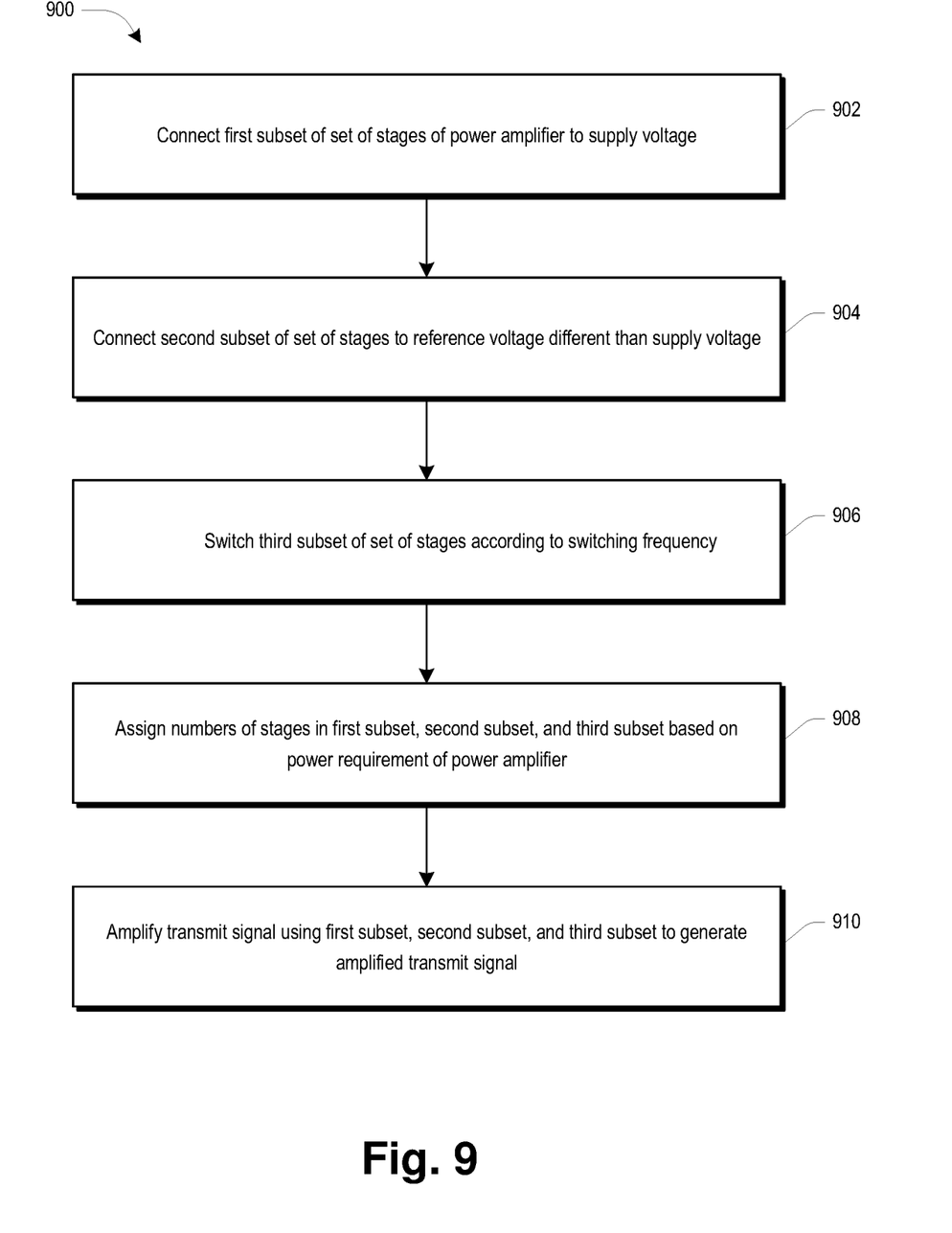
FIG. 9 is an illustration of an example method for controlling an SCPA, according to some embodiments.

FIG. 9 is an illustration of an example method 900 for controlling an SCPA 205, 600 according to some embodiments. At 902, a first subset 310S, 610S of a set of stages 300S, 305S, 600S of a power amplifier 205, 600 is connected to a supply voltage. At 904, a second subset 310R, 610R of the set of stages 300S, 305S, 600S is connected to a reference voltage different than the supply voltage. At 906, a third subset 310A, 610A of the set of stages 300S, 305S, 600S is switched according to a switching frequency. At 908, numbers of stages in the first subset 310S, 610S, the second subset 310R, 610R, and the third subset 310A, 610A are assigned based on a power requirement of the power amplifier 205, 600. At 910, a transmit signal is amplified using the first subset 310S, 610S, the second subset 310R, 610R, and the third subset 310A, 610A to generate an amplified transmit signal.

Figure 10:
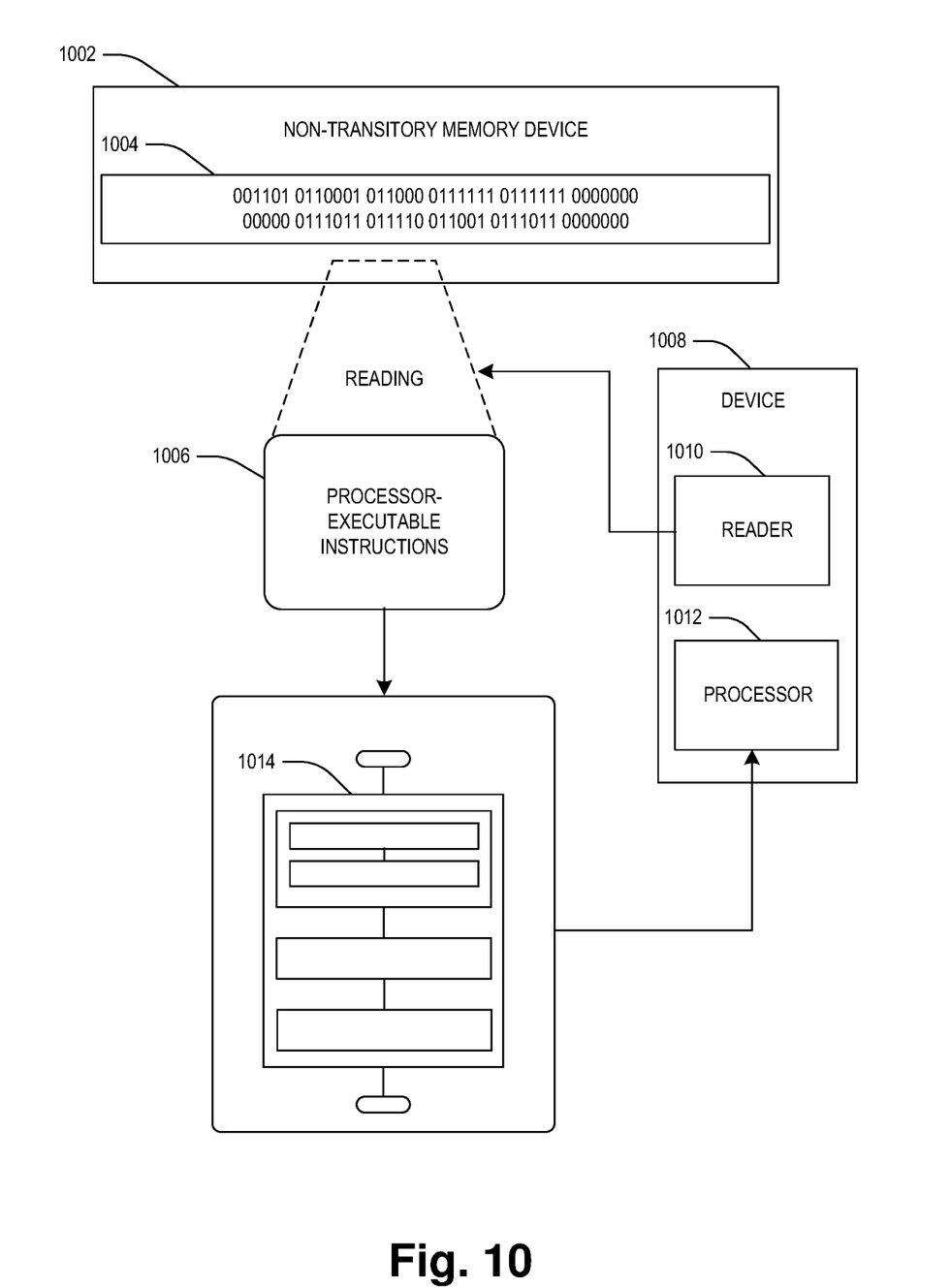
FIG. 10 illustrates an exemplary computer-readable medium, according to some embodiments.

FIG. 10 illustrates an exemplary embodiment 1000 of a computer-readable medium 1002, according to some embodiments. One or more embodiments involve a computer-readable medium comprising processor-executable instructions configured to implement one or more of the techniques presented herein. The embodiment 1000 comprises a non-transitory computer-readable medium 1002 (e.g., a CD-R, DVD-R, flash drive, a platter of a hard disk drive, etc.), on which is encoded computer-readable data 1004. This computer-readable data 1004 in turn comprises a set of processor-executable computer instructions 1006 that, when executed by a computing device 1008 including a reader 1010 for reading the processor-executable computer instructions 1006 and a processor 1012 for executing the processor-executable computer instructions 1006, are configured to facilitate operations according to one or more of the principles set forth herein. In some embodiments, the processor-executable computer instructions 1006, when executed, are configured to facilitate performance of a method 1014, such as at least some of the aforementioned method(s). In some embodiments, the processor-executable computer instructions 1006, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment, a transmitter comprises a power amplifier comprising a set of stages, each stage of the set of stages comprising an inverter, and a capacitor connected in series with the inverter, and a control unit configured to connect a first subset of the set of stages to a supply voltage, connect a second subset of the set of stages to a reference voltage different than the supply voltage, and switch a third subset of the set of stages according to a switching frequency, wherein the control unit is configured to determine numbers of stages in the first subset of the set of stages, the second subset of the set of stages, and the third subset of the set of stages based on a power requirement of the power amplifier, and a transmit signal is amplified in the power amplifier using the first subset of the set of stages, the second subset of the set of stages, and the third subset of the set of stages to generate an amplified transmit signal.

In an embodiment, a number of stages in the first subset equals a number of stages in the second subset.

In an embodiment, a compensation network is connected to the set of stages.

In an embodiment, the compensation network comprises a first capacitor connected between the set of stages and the supply voltage, and a second capacitor connected between the set of stages and the reference voltage.

In an embodiment, the control unit is configured to connect stages in the first subset to the supply voltage by asserting a logic zero on inverters of the stages in the first subset, and connect stages in the second subset to the reference voltage by asserting a logic one on inverters of the stages in the second subset.

In an embodiment, the power amplifier comprises a matching network connected to the set of stages.

In an embodiment, the amplified transmit signal comprises a rectified sine wave.

In an embodiment, the control unit is configured to change at least one of the first number of stages, the second number of stages, or the third number of stages based upon a change in the power requirement for the power amplifier.

In an embodiment, the transmitter comprises a second power amplifier comprising a second set of stages, each stage of the second set of stages comprises an inverter, and a capacitor connected in series with the inverter, wherein the control unit is configured to connect a first subset of the second set of stages to the supply voltage, connect a second subset of the second set of stages to the reference voltage, and switch a third subset of the second set of stages according to the switching frequency, wherein the control unit is configured to determine numbers of stages in the first subset of the second set of stages, the second subset of the second set of stages, and the third subset of the second set of stages based on a power requirement of the second power amplifier, and the transmit signal is amplified in the second power amplifier using the first subset of the second set of stages, the second subset of the second set of stages, and the third subset of the second set of stages to generate the amplified transmit signal.

In an embodiment, a radio comprises a modem configured to generate a transmit signal, an antenna port, a transmit-receive switch connected to the antenna port, a receiver connected to the transmit-receive switch, and a transmitter connected to the transmit-receive switch and comprising a first power amplifier comprises a first set of stages, a second power amplifier comprising a second set of stages, each stage of the first set of stages and the second set of stages comprises an inverter comprising a high side switch and a low side switch connected to the high side switch at a drain node, and a capacitor connected in series with the inverter, and a control unit configured to connect a first subset of the first set of stages to a supply voltage, connect a first subset of the second set of stages to the supply voltage, connect a second subset of the first set of stages to a reference voltage different than the supply voltage, connect a second subset of the second set of stages to the reference voltage, switch a third subset of the first set of stages according to a switching frequency, and switch a third subset of the second set of stages according to the switching frequency, and a processor configured to control the transmit-receive switch to toggle between a transmit mode and a receive mode, wherein the transmitter is connected to an antenna at the antenna port when the transmit-receive switch is in the transmit mode, the receiver is connected to the antenna when the transmit-receive switch is in the receive mode, the control unit is configured to determine numbers of stages in the first subset of the first set of stages, the second subset of the first set of stages, the third subset of the first set of stages, the first subset of the second set of stages, the second subset of the second set of stages, and the third subset of the second set of stages based on a power requirement of at least one of the first power amplifier or the second power amplifier, and the transmit signal is amplified in at least one of the first power amplifier or the second power amplifier using the first subset of the first set of stages, the second subset of the first set of stages, the third subset of the first set of stages, the first subset of the second set of stages, the second subset of the second set of stages, and the third subset of the second set of stages to generate an amplified transmit signal.

In an embodiment, a number of stages in the first subset of the first set of stages equals a number of states in the second subset of the first set of stages.

In an embodiment, the control unit is configured to connect stages in the first subset of the first set of stages to the supply voltage by asserting a logic zero on inverters of the stages in the first subset of the first set of stages.

In an embodiment, the control unit is configured to connect stages in the second subset of the first set of stages to the reference voltage by asserting a logic one on inverters of the stages in the second subset of the first set of stages.

In an embodiment, the control unit is configured to connect stages in the first subset of the second set of stages to the supply voltage by asserting a logic zero on inverters of the stages in the first subset of the second set of stages.

In an embodiment, the control unit is configured to connect stages in the second subset of the second set of stages to the reference voltage by asserting a logic one on inverters of the stages in the second subset of the second set of stages.

In an embodiment, the control unit is configured to assign all stages in the first set of stages to the first subset of the first set of stages prior to assigning any of the stages in the second set of stages to the first subset of the second set of stages.

In an embodiment, the control unit is configured to change a number of stages in at least one of the first subset of the first set of stages, the first subset of the second set of stages, the second subset of the first set of stages, or the second subset of the second set of stages depending on the power requirement for at least one of the first power amplifier or the second power amplifier.

In an embodiment, a method comprises connecting a first subset of a set of stages of a power amplifier to a supply voltage, connecting a second subset of the set of stages to a reference voltage different than the supply voltage, switching a third subset of the set of stages according to a switching frequency, assigning numbers of stages in the first subset, the second subset, and the third subset based on a power requirement of the power amplifier, and amplifying a transmit signal using the first subset, the second subset, and the third subset to generate an amplified transmit signal.

In an embodiment, the method comprises connecting a compensation network to the set of stages, comprising connecting a first capacitor between the first subset and the supply voltage, and connecting a second capacitor between the second subset and the reference voltage.

In an embodiment, connecting the first subset to the supply voltage comprises asserting a logic zero on inverters of stages in the first subset, and connecting the second subset to the reference voltage comprises asserting a logic one on inverters of stages in the second subset.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A transmitter, comprising:
   a power amplifier comprising a set of stages, each stage of the set of stages comprising:
      an inverter; and
      a capacitor connected in series with the inverter; and
   a control unit configured to:
      connect a first subset of the set of stages to a supply voltage;
      connect a second subset of the set of stages to a reference voltage different than the supply voltage; and
      switch a third subset of the set of stages according to a switching frequency, wherein:
         the control unit is configured to determine numbers of stages in the first subset of the set of stages, the second subset of the set of stages, and the third subset of the set of stages based on a power requirement of the power amplifier; and
         a transmit signal is amplified in the power amplifier using the first subset of the set of stages, the second subset of the set of stages, and the third subset of the set of stages to generate an amplified transmit signal.

2. The transmitter of claim 1, wherein:
   a number of stages in the first subset equals a number of stages in the second subset.

3. The transmitter of claim 1, comprising:
   a compensation network connected to the set of stages.

4. The transmitter of claim 3, wherein the compensation network comprises:
   a first capacitor connected between the set of stages and the supply voltage; and
   a second capacitor connected between the set of stages and the reference voltage.

5. The transmitter of claim 1, wherein the control unit is configured to:

connect stages in the first subset to the supply voltage by asserting a logic zero on inverters of the stages in the first subset; and connect stages in the second subset to the reference voltage by asserting a logic one on inverters of the stages in the second subset.

6. The transmitter of claim 1, wherein:
the power amplifier comprises a matching network connected to the set of stages.

7. The transmitter of claim 1, wherein:
the amplified transmit signal comprises a rectified sine wave.

8. The transmitter of claim 1, wherein the control unit is configured to:
change at least one of the first number of stages, the second number of stages, or the third number of stages based upon a change in the power requirement for the power amplifier.

9. The transmitter of claim 1, comprising:
a second power amplifier comprising a second set of stages, each stage of the second set of stages comprising:
an inverter; and
a capacitor connected in series with the inverter, wherein:
the control unit is configured to:
connect a first subset of the second set of stages to the supply voltage;
connect a second subset of the second set of stages to the reference voltage; and
switch a third subset of the second set of stages according to the switching frequency, wherein:
the control unit is configured to determine numbers of stages in the first subset of the second set of stages, the second subset of the second set of stages, and the third subset of the second set of stages based on a power requirement of the second power amplifier; and
the transmit signal is amplified in the second power amplifier using the first subset of the second set of stages, the second subset of the second set of stages, and the third subset of the second set of stages to generate the amplified transmit signal.

10. A radio, comprising:
a modem configured to generate a transmit signal;
an antenna port;
a transmit-receive switch connected to the antenna port;
a receiver connected to the transmit-receive switch; and
a transmitter connected to the transmit-receive switch and comprising:
a first power amplifier comprising a first set of stages;
a second power amplifier comprising a second set of stages, each stage of the first set of stages and the second set of stages comprising:
an inverter comprising a high side switch and a low side switch connected to the high side switch at a drain node; and
a capacitor connected in series with the inverter; and
a control unit configured to:
connect a first subset of the first set of stages to a supply voltage;
connect a first subset of the second set of stages to the supply voltage;
connect a second subset of the first set of stages to a reference voltage different than the supply voltage;

connect a second subset of the second set of stages to the reference voltage;
switch a third subset of the first set of stages according to a switching frequency; and
switch a third subset of the second set of stages according to the switching frequency; and
a processor configured to control the transmit-receive switch to toggle between a transmit mode and a receive mode, wherein:
the transmitter is connected to an antenna at the antenna port when the transmit-receive switch is in the transmit mode;
the receiver is connected to the antenna when the transmit-receive switch is in the receive mode;
the control unit is configured to determine numbers of stages in the first subset of the first set of stages, the second subset of the first set of stages, the third subset of the first set of stages, the first subset of the second set of stages, the second subset of the second set of stages, and the third subset of the second set of stages based on a power requirement of at least one of the first power amplifier or the second power amplifier; and
the transmit signal is amplified in at least one of the first power amplifier or the second power amplifier using the first subset of the first set of stages, the second subset of the first set of stages, the third subset of the first set of stages, the first subset of the second set of stages, the second subset of the second set of stages, and the third subset of the second set of stages to generate an amplified transmit signal.

11. The radio of claim 10, wherein:
a number of stages in the first subset of the first set of stages equals a number of states in the second subset of the first set of stages.

12. The radio of claim 10, wherein the control unit is configured to:
connect stages in the first subset of the first set of stages to the supply voltage by asserting a logic zero on inverters of the stages in the first subset of the first set of stages.

13. The radio of claim 12, wherein the control unit is configured to:
connect stages in the second subset of the first set of stages to the reference voltage by asserting a logic one on inverters of the stages in the second subset of the first set of stages.

14. The radio of claim 12, wherein the control unit is configured to:
connect stages in the first subset of the second set of stages to the supply voltage by asserting a logic zero on inverters of the stages in the first subset of the second set of stages.

15. The radio of claim 12, wherein the control unit is configured to:
connect stages in the second subset of the second set of stages to the reference voltage by asserting a logic one on inverters of the stages in the second subset of the second set of stages.

16. The radio of claim 10, wherein the control unit is configured to:
assign all stages in the first set of stages to the first subset of the first set of stages prior to assigning any of the stages in the second set of stages to the first subset of the second set of stages.

17. The radio of claim 10, wherein the control unit is configured to:

change a number of stages in at least one of the first subset of the first set of stages, the first subset of the second set of stages, the second subset of the first set of stages, or the second subset of the second set of stages depending on the power requirement for at least one of the first power amplifier or the second power amplifier.

18. A method, comprising:

connecting a first subset of a set of stages of a power amplifier to a supply voltage;

connecting a second subset of the set of stages to a reference voltage different than the supply voltage;

switching a third subset of the set of stages according to a switching frequency;

assigning numbers of stages in the first subset, the second subset, and the third subset based on a power requirement of the power amplifier; and amplifying a transmit signal using the first subset, the second subset, and the third subset to generate an amplified transmit signal.

19. The method of claim 18, comprising:

connecting a compensation network to the set of stages, comprising:

connecting a first capacitor between the first subset and the supply voltage; and connecting a second capacitor between the second subset and the reference voltage.

20. The method of claim 18, wherein:

connecting the first subset to the supply voltage comprises:

asserting a logic zero on inverters of stages in the first subset; and connecting the second subset to the reference voltage comprises:

asserting a logic one on inverters of stages in the second subset.

* * * * *